May 15, 1962

F. G. FRANCIS ETAL
TRANSFER SHEET COATED WITH STABILIZED
COLORLESS LEUCAURAMINE DERIVATIVE
Filed July 31, 1959

3,034,917

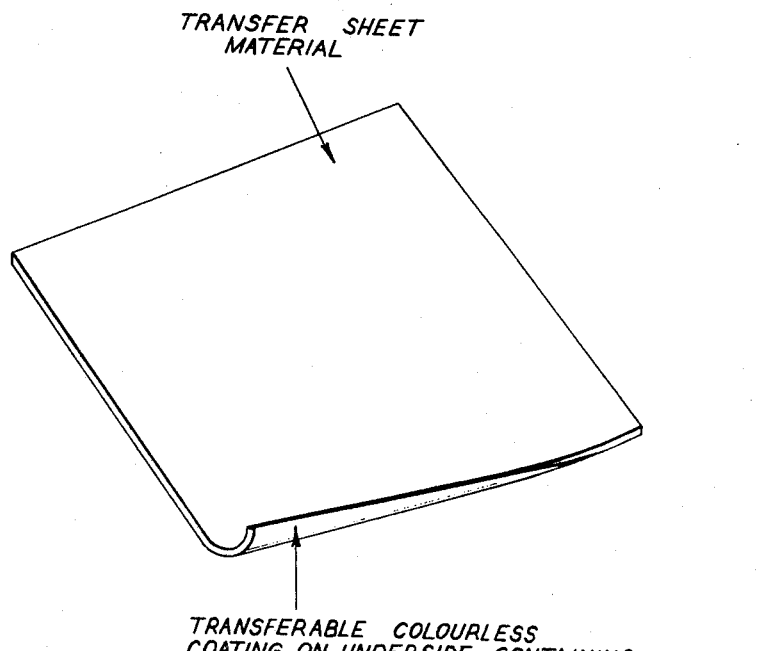

TRANSFER SHEET MATERIAL

TRANSFERABLE COLOURLESS
COATING ON UNDERSIDE CONTAINING
(1) AS ACTIVE MATERIAL, A COLOURLESS
LEUCAURAMINE DERIVATIVE AND
(2) AS A STABILIZER THEREFOR,
P-BENZYLAMINO-PHENOL, DIPHENYLAMINE,
N-PHENYL-2 NAPHYLAMINE, OR
1,5-DIHYDROXY-NAPHTHALENE
OR A SALT THEREOF.

INVENTOR
Frederick George Francis
David John Neale
BY
Albert J. Jackes
ATTORNEY

United States Patent Office 3,034,917
Patented May 15, 1962

3,034,917
TRANSFER SHEET COATED WITH STABILIZED COLORLESS LEUCAURAMINE DERIVATIVE
Frederick George Francis, London, and David John Neale, Woodford, Essex, England, assignors to Caribonum Limited, London, England, a British company
Filed July 31, 1959, Ser. No. 830,742
Claims priority, application Great Britain Aug. 26, 1958
5 Claims. (Cl. 117—36.2)

The present invention relates to manifolding and is concerned, in particular, with paper or like sheet record material of the kind which carries colourless coatings including chemical reactants arranged in such a way that one reactant is brought into contact with the other through writing upon a sheet or stack of sheets of the record material and colour in the form of the written matter is produced upon the sheet or sheets.

Most of the known coatings on sheet record materials of this kind which contain colour-producing reactants have the disadvantage that they tend, on long exposure to light, to develop a small amount of colour. If the coatings include crystal violet lactone and benzoyl-leucomethylene blue, for example, this discolouration takes the form of a blue colouration and, if a substituted leucauramine is the colour-producing reactant in the coating, a slight brownish tint may be produced.

Many previously proposed sheet record materials of the colour-producing kind contain derivatives of leucauramine, which is the colourless leuco base of the yellow dyestuff auramine, and these derivatives can range from simple compounds, such as phenyl-leucauramine, to more complex mono- and di-substituted leucauramines. One example of a relatively complex substance of this kind is the leucauramine derivative of p-aminobenzyl-leucomethylene blue, i.e. 10-(4-N-leucauramine-benzoyl)-3,7-bis-(dimethylamino)-phenothiazine, disclosed in U.S. Patent No. 2,915,415 to F. G. Francis et al., dated December 1, 1958.

As is well-known, leucauramine derivatives can be considered to be substances derived from Michler's hydrol, 4,4'-(dimethylamino)-diphenyl-carbinol, in which the —OH group is replaced by a substituted —NH— group; leucauramine derivatives can be made by the standard method of preparing secondary amines, by condensing a carbinol with a primary amine. This general reaction is disclosed, for example, in U.S. Patent No. 2,828,341 to C. S. Adams et al., dated March 25, 1958, and for the leucauramine derivative in the aforesaid U.S. Patent No. 2,915,415 to Francis.

When a sheet of paper carrying a colourless coating of a leucauramine derivative is brought into juxtaposition with a sheet of paper coated with an acid receptive coating, for example, a coating containing tannin and phosphotungstic acid as described in our British Patent No. 852,131 (as would be the case if a number of sheets each carrying the two coatings on opposite sides were arranged as a manifolding pack and stored for future use), there is a tendency for the acid coating to develop a yellow colour in the course of time. This discolouration of the acid coating, which may be the acid-coated side of the sheet record material, is shown more when certain leucauramine derivatives are present in the other coatings, i.e. the transferable coatings, and the tendency can be largely offset by appropriate choice of the leucauramine derivatives. Examples of derivatives which are particularly suitable in this respect are heterocyclic compounds typified by morpholinyl-leucauramine, piperidyl-leucauramine, piperazyl-di-leucauramine and monocarbethoxypiperazyl-leucauramine. Sheet record materials which contain these colour-producing materials in the transferable coating show little or no tendency for discolouration to occur in an acid coating disposed in juxtaposition thereto.

It is found, however, that colour-producing compounds such as morpholinyl-leucauramine which have good stability as regards discolouration of an acid coating in contact therewith have the disadvantage that transferable coatings containing them, when exposed to light and particularly to bright sunlight, tend to develop a yellow discolouration. This discolouration is unsightly, since in the majority of cases it is desirable for the manifolding paper to have a clean white surface, and can be accompanied by a lesser sensitivity of the coating. The mechanism involved in the production of the yellow discolouration is not fully understood, but it is believed probably to be due to decomposition of the leucauramine derivative under the influence of light, not into Michler's hydrol and the appropriate amino compound, but into leucauramine itself and the corresponding hydrocarbon. In other words, the molecule ruptures at the opposite side of the amino group N atom from that at which the bond is formed in producing the leucauramine derivative from Michler's hydrol and an amine. For instance, phenyl-leucauramine would produce leucauramine and benzene if decomposed in this way. Atmospheric oxidation of the leucauramine would then produce the yellow colour of auramine itself. The tendency for the active coating to become yellow manifests itself quite rapidly, particularly on exposure to brilliant sunlight, when the development of the yellow colour can be observed in about half an hour to one hour and is very marked after a few hours.

It is accordingly an object of the present invention to provide compositions of matter and sheet record materials for use in manifolding which have a leucauramine derivative in the transferable coating thereof, wherein the leucauramine derivative is stabilized against light-initiated decomposition and the production of the yellow discolouration is thereby reduced or eliminated.

A perspective view of the transfer sheet is illustrated in the drawing.

According to the present invention, a composition of matter is provided for use as a transferable colourless active coating on sheet record material, which contains a leucauramine derivative as a colour-forming substance and a stabilizer for minimizing the formation of a yellow discolouration through decomposition of the leucauramine derivative.

One example of a stabilizer, which is found to be capable of suppressing any tendency to discolour even with relatively unstable heterocyclic leucauramine derivatives such as morpholinyl-leucauramine, piperidyl-leucauramine and piperazyl-di-leucauramine, is p-benzylamino-phenol, particularly in the form of a salt such as the hydrochloride. Other effective stabilizers are diphenylamine or its salts, N-phenyl-2-naphthylamine or its salts and 1,5-dihydroxynaphthalene.

It may be mentioned that the yellow discolouration is not found with all leucauramine derivatives and there appears to be a general increase in instability with increasing complexity of the leucauramine derivatives, particularly if these contain a heterocyclic radical such as the morpholinyl, piperazyl and piperidyl radicals mentioned above. If a simpler derivative such as phenyl-leucauramine or α-naphthyl-leucauramine is used, its relatively greater stability to decomposition of the kind which leads to a yellowing of the sheet record material generally makes it unnecessary to associate with it a stabilizing substance in accordance with the invention.

The amount of stabilizer required to reduce any discolouration to a virtually unnoticeable extent may be as little as 0.05% of the total weight of the coating mixture and, although greater amounts can be used, such as 0.5%, it is found that satisfactory results can normally be obtained with not more than 0.2% of the total weight of the coating. This later proportion is suitable for those cases where the stabilizer is diphenylamine, N-phenyl-2-naphthylamine, their salts or 1,5-dihydroxy-naphthalene, which do not have such a marked stabilizing effect as p-benzylamino-phenol hydrochloride.

As mentioned previously, it has been observed that formation of the yellow discolouration is generally accompanied by a loss of sensitivity of the active coating, which supports the view that the discolouration is due to decomposition of the leucauramine derivative present in the coating. If an active coating is exposed to bright sunlight for some hours, its sensitivity can be reduced by more than 50% and a further effect is that the blue colour normally formed on an acid coating, by transfer to it of the active coating by writing upon a manifolding pack of the record material, for instance, is not produced in the same way if the active coating has become yellowed. The blue colour then formed has less depth and intensity and has a modified shade, frequently being a rather dull greenish blue. It is found that these additional defects caused by the action of light upon the active coating are also offset by the use of the stabilizers of the invention.

In order that the invention may be readily understood, the following examples set out formulations of active coatings containing a stabilizer in accordance with the invention.

*Example 1*

|  | Percent by weight |
|---|---|
| (1) Gelatin | 13.1 |
| Water | 41.65 |
| (2) Precipitated calcium carbonate | 10.1 |
| Titanium dioxide | 2.38 |
| (3) Soda ash | 0.6 |
| Water | 4.8 |
| (4) "Perminal" EML, 10% aq. soln | 2.38 |
| "Mycocide" DG | 0.07 |
| (5) Sextol phthalate | 11.9 |
| Tricresyl phosphate | 11.9 |
| Morpholinyl-leucauramine | 1.07 |
| (6) p-Benzylamino-phenol hydrochloride | 0.05 |
|  | 100.00 |

*Example 2*

| (1) Gelatin | 13.1 |
|---|---|
| Water | 41.5 |
| (2) Precipitated calcium carbonate | 10.1 |
| Titanium dioxide | 2.38 |
| (3) Soda ash | 0.6 |
| Water | 4.8 |
| (4) "Perminal" EML, 10% aq. soln | 2.38 |
| "Mycocide" DG | 0.07 |
| (5) Sextol phthalate | 11.9 |
| Tricresyl phosphate | 11.9 |
| Piperidyl-leucauramine | 1.07 |
| (6) Diphenylamine | 0.20 |
|  | 100.00 |

*Example 3*

| (1) Gelatin | 13.1 |
|---|---|
| Water | 41.5 |
| (2) Precipitated calcium carbonate | 10.1 |
| Titanium dioxide | 2.38 |
| (3) Soda ash | 0.6 |
| Water | 4.8 |
| (4) "Perminal" EML, 10% aq. soln | 2.38 |
| "Mycocide" DG | 0.07 |
| (5) Sextol phthalate | 11.9 |
| Tricresyl phosphate | 11.9 |
| Piperaxyl-di-leucauramine | 1.07 |
| (6) N-phenyl-2-naphthylamine | 0.20 |
|  | 100.00 |

Another formulation is identical with that in Example 3, except that monocarbethoxypiperazyl-leucauramine is used instead of piperazyl-di-leucauramine.

The coating emulsions typified by the above examples are prepared as follows:

(1) The gelatin is dissolved in the water which is at a temperature of about 60° C.;
(2) The precipitated calcium carbonate and titanium dioxide are stirred into the gelatin solution;
(3) The soda ash is dissolved in the water and the solution added to the pigmented gelatin solution;
(4) The "Perminal" EML, which is an emulsifying agent, and the "Mycocide" DG, which is a fungicide used to prevent mould formation in the ultimate coating, are then added;
(5) The leucauramine derivative is dissolved in a mixture of the sextol phthalate and tricresyl phosphate at 60°–70° C. and the resultant solution is emulsified into the pigmented gelatin solution (items (1) to (4) inclusive) with vigorous stirring;
(6) The stabilizer is then added to the emulsion.

The coating composition so obtained is then applied to a paper web by any suitable coating process and the paper used may, if desired, be pre-treated with one or more barrier coatings to prevent penetration of the oily phase of the emulsion thereinto. The coated paper web is then cut into sheets, which may be used as such as the top sheet of a manifolding pack or with a copy sheet having an acid-coated upper surface. Alternatively, the paper web may be coated on the other side with an acid coating including tannin and phosphotungstic acid, for example, and cut into sheets for use as a manifolding pack or as the intermediate sheets thereof between an emulsion-coated top sheet and an acid-coated bottom sheet. In such sheets, when stored with unlike surfaces in juxtaposition, there is no tendency for the acid coatings to turn yellow or brown, since the leucauramine derivatives mentioned in the examples do not promote such a discolouration, and, due to the presence of stabilizers, there is also no tendency for the active coatings to turn yellow or brown.

We claim:

1. A sheet record material, which consists essentially of a paper web, a transferable, colourless active coating carried on one side of the paper web, a colourless leucauramine derivative selected from the group consisting of morpholinyl - leucauramine, piperidyl - leucauramine, piperazyl-dileucauramine, monocarbethoxy-piperazyl-leucauramine and 10-(4-N-leucauramine-benzoyl)-3,7-bis-(dimethylamino)-phenothiazine contained in the coating and, as a stabilizer for the leucauramine derivative for minimizing formation of a yellow discolouration in the coating, a substance selected from the group consisting of p-benzylamino-phenol, diphenylamine, N-phenyl-2-naphthylamine, 1,5-dihydroxy-naphthalene and salts thereof, the stabilizing substance being present in an amount ranging from 0.05% to 0.5% by weight of the coating.

2. The sheet record material of claim 1, wherein the stabilizing substance is present in an amount of 0.2% by weight of the coating.

3. A sheet record material, which consists essentially of a paper web carrying on one side thereof a transferable colourless active coating containing morpholinyl-leucauramine, wherein the coating also contains from 0.05% to 0.5% by weight of p-benzylamino-phenol hydrochloride as a stabilizer for the morpholinyl-leucauramine for minimising formation of a yellow discolouration in the transferable coating.

4. A sheet record material, which consists essentially of a paper web carrying on one side thereof a transferable colourless active coating containing piperidyl-leucauramine, wherein the coating also contains from 0.05% to 0.5% by weight of diphenylamine as a stabilizer for the piperidyl-leucauramine for minimizing formation of a yellow discolouration in the transferable coating.

5. A sheet record material, which consists essentially of a paper web carrying on one side thereof a transferable colourless active coating containing piperazyl-di-leucauramine, wherein the coating also contains from 0.05% to 0.5% by weight of N-phenyl-2-naphthylamine as a stabilizer for the piperazyl-di-leucauramine for minimising formation of a yellow discolouration in the transferable coating.

References Cited in the file of this patent
UNITED STATES PATENTS

| | | |
|---|---|---|
| 1,958,711 | Murray | May 15, 1934 |
| 2,595,853 | Horclois | May 6, 1952 |
| 2,607,774 | Clapp | Aug. 19, 1952 |
| 2,646,367 | Davis et al. | July 21, 1953 |
| 2,730,456 | Green et al. | Jan. 10, 1956 |
| 2,915,415 | Francis et al. | Dec. 1, 1959 |
| 2,939,009 | Tien | May 31, 1960 |
| 2,949,381 | Steinhardt | Aug. 16, 1960 |